United States Patent
Guinet

(10) Patent No.: US 6,354,052 B1
(45) Date of Patent: Mar. 12, 2002

(54) METHOD FOR FOLDING SECTIONS COMPRISING A HOLLOW BODY AND A COATING SHEET, AND RESULTING FOLDED SECTION

(75) Inventor: André Guinet, Crissey (FR)

(73) Assignee: SEVA, Chalon sur Saone (FR)

( * ) Notice: Subject to any disclaimer, the term of this patent is extended or adjusted under 35 U.S.C. 154(b) by 0 days.

(21) Appl. No.: 09/402,435

(22) PCT Filed: Feb. 8, 1999

(86) PCT No.: PCT/FR99/00272

§ 371 Date: Dec. 7, 1999

§ 102(e) Date: Dec. 7, 1999

(87) PCT Pub. No.: WO99/41058

PCT Pub. Date: Aug. 19, 1999

(30) Foreign Application Priority Data

Feb. 10, 1998 (FR) ............................................. 98 01555
Apr. 28, 1998 (FR) ............................................. 98 05327

(51) Int. Cl.$^7$ ................................................ E04B 9/00
(52) U.S. Cl. ......................... 52/363.5; 52/172; 52/658; 72/332; 403/295
(58) Field of Search ................................ 52/656.5, 657, 52/658, 786.13, 734.2; 72/298, 369; 264/138, 322, 339

(56) References Cited

U.S. PATENT DOCUMENTS

| | | | |
|---|---|---|---|
| 3,280,523 A | * 10/1966 | Stroud et al. | ........ 52/786.13 X |
| 4,574,553 A | * 3/1986 | Lisec | ........................... 52/658 |
| 4,627,263 A | 12/1986 | Bayer et al. | |
| 4,945,619 A | 8/1990 | Bayer | |
| 5,048,997 A | * 9/1991 | Peterson | ............... 52/786.13 X |
| 5,231,862 A | * 8/1993 | Ashley | .............. 29/897.312 X |
| 5,255,481 A | * 10/1993 | Misera et al. | ............. 52/658 X |
| 5,640,828 A | 6/1997 | Reeves et al. | |

FOREIGN PATENT DOCUMENTS

| | | |
|---|---|---|
| DE | 25 48 821 | 5/1977 |
| EP | 0 127 739 | 12/1984 |
| FR | 1260187 | 8/1961 |
| GB | 1 522 724 | 8/1978 |

* cited by examiner

*Primary Examiner*—Carl D. Friedman
*Assistant Examiner*—Steve Varner
(74) *Attorney, Agent, or Firm*—Wenderoth, Lind & Ponack, L.L.P.

(57) ABSTRACT

A method of forming a composite profile including a hollow body with approximately parallel opposite walls and a covering sheet fixed against a first one of the walls includes heating a portion of the composite profile to form a temperature gradient. A hot forming projection is then pressed against a second one of the walls so as to bring the first wall into contact with the second wall at a formed region. At least one section of the profile is then pivoted about the formed region so as to produce a folding line.

62 Claims, 2 Drawing Sheets

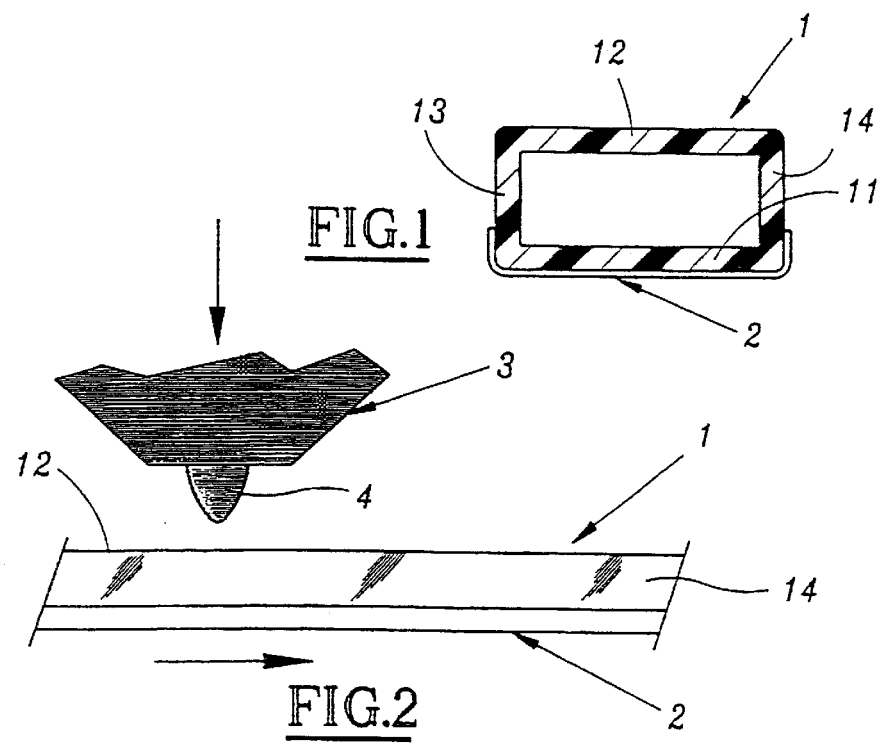
FIG.1
FIG.2
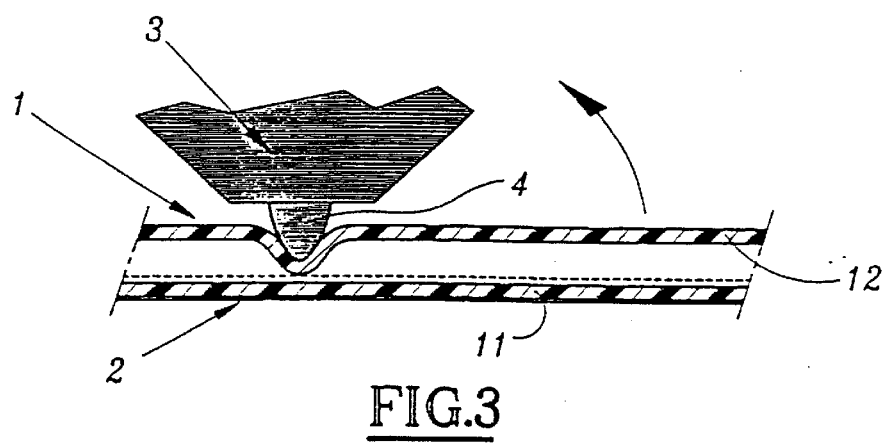
FIG.3
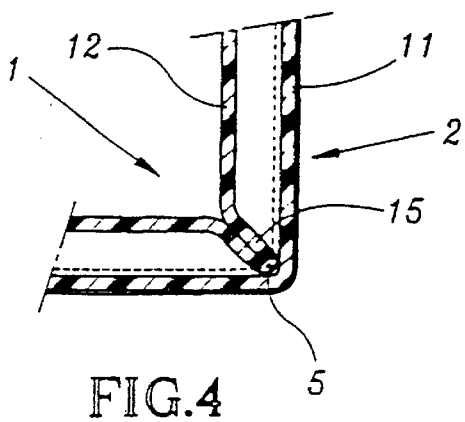
FIG.4
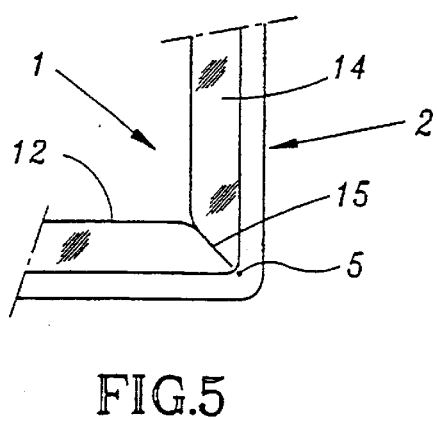
FIG.5

METHOD FOR FOLDING SECTIONS COMPRISING A HOLLOW BODY AND A COATING SHEET, AND RESULTING FOLDED SECTION

BACKGROUND OF THE INVENTION

The invention relates to a method for folding a composite profile comprising a hollow body. The hollow body has a closed or virtually closed contour and is made of, in particular, synthetic material, has approximately parallel opposite walls connected by edges, and has a covering sheet fixed against one wall of the body and those regions of the edges close to this wall. The invention also relates to the profiles folded using this parallel covering sheet those regions invention also method.

For a number of applications, and in particular in order to produce bracing frames for the two panes or sheets of glass of double-glazed windows, it is necessary to fold a composite profile comprising a hollow body which has a completely or virtually closed contour and which is made of synthetic material, with one wall covered with a sealing sheet. Thus, a frame of polygonal shape which is generally but not necessarily rectangular is formed.

According to a known method, in each part of the profile in which a fold is to be produced, a transverse notch in one wall of the profile, which notch has a triangular or trapezoidal section so that it possible to produce a fold at the desired angle. For example, at right angles, the notch is located inside the angle, without the material tending to impede folding. With this method, however, the profile has a zone of weakness at the fold.

SUMMARY OF THE INVENTION

The object of the invention is to remedy this disadvantage by devising a folding method which is capable of being implemented easily and which allows the production of extremely sturdy folded profiles.

To this end, the invention relates to a method for folding a composite profile comprising a hollow body which has a closed or virtually closed contour and which has approximately parallel opposite walls connected by edges, and a covering sheet fixed against one wall of the body and those regions of the edges close to this wall. A part of the profile in which a fold is to be produced is heated with a temperature gradient extending from the sheet to the wall opposite that to which the sheet is fixed. A hot forming projection or a hot projecting detachable element carried by a tool is in this part pressed against this opposite wall so as locally to bring it closer to or into contact with the wall to which the sheet is fixed and thus to form the region of the future fold. The projection or the tool after having the detachable element disconnected from it is retracted, and, while supporting the edges of the profile so as to avoid them being deformed laterally in relation to the latter, at least one of the parts of the profile which are on both sides of the formed region is pivoted so as to produce in this formed region a fold along a folding line extending transversely to the walls of the body approximately at the level of the limit of the sheet on the edges.

By virtue of the fact that the material is not notched at the fold, no incipient tear is created in the profile.

The method according to the invention can also have one or more of the following characteristics.

In the part of the composite profile in which a fold is to be produced, the body is heated to a temperature at most equal to that at which the material of which it consists becomes soft.

The edges of the profile are supported so as to prevent them from being deformed laterally when the forming projection or the detachable element is pressed against the body.

The support of the edges of the profile so as to avoid their deformation is started after the wall opposite the covering and the wall provided with the covering have been brought closer or into contact.

The folding line is located by aligning a folding articulation axis facing the desired location of this folding line.

The folding line is located approximately at the level of the limit of the sheet on the edges of the body, in a zone covered by the sheet.

The folding line is located approximately at the level of the limit of the sheet on the edges of the body, in a zone which is not covered by the sheet.

After the production of the fold, at least the region of the fold is cooled.

A number of operations are performed simultaneously on one and the same profile. To be more precise, at least one part of the profile is heated while a projection or a detachable element carried by a tool is pressed onto at least one other hot part of the profile, and then a fold is produced in this other part.

The profile is conveyed along and is stopped in successive stations of a folding installation in which stations, respectively, the profile is heated, pressure is applied to one wall of the body and a fold is produced in the profile, and the region of the fold is cooled.

In the same station of the folding installation, a part of the profile is heated. A projection or a detachable element is then pressed onto this part, and a fold is produced in this part in successive operations.

After the stages in which a hot forming projection is pressed against one wall of the profile so as locally to bring it closer to or into contact with the wall to which the sheet is fixed and thus to form the region of the future fold, the projection is retracted. An element forming an insert is accommodated in the region of the future fold, and this is followed by the stage in which, while supporting the edges of the profile, at least one of the parts of the latter which are on both sides of the formed region is pivoted so as to produce the fold.

Prior to the stage during which an element forming an insert is accommodated in the region of the future fold, this element forming an insert is heated in order then to place it while hot in the region of the future fold.

Before the stage in which a hot projecting detachable element carried by a tool is pressed against one wall of the profile, the element is connected to the tool in a detachable manner. At least a part of this detachable element is then heated.

Before the stage in which a hot projecting detachable element carried by a tool is pressed against one wall of the profile, at least a part of this detachable element is heated. The element is then connected to the tool in a detachable manner.

After having disconnected the detachable element and retracted the tool, the detachable element being accommodated in the region of the future fold, and while supporting the edges of the profile so as to prevent them from being deformed, at least one of the parts of the profile which are on both sides of the formed region is pivoted.

The invention, also relates to a profile comprising a hollow body which has a closed or virtually closed contour and which has approximately parallel opposite walls connected by edges, and a covering sheet fixed against one wall of the body and those regions of the edges close to this wall. At least one fold designs an angle, the covering sheet being located outside the angle, and the wall of the body opposite that to which the sheet is fixed has inside the angle a pleat comprising two thicknesses of material welded one against the other or in immediate proximity forming a rigidifying rib extending in the direction of the wall to which the sheet is fixed.

This profile can also have one or more of the following characteristics:

It comprises a folding line extending transversely to the walls of the body approximately at the level of the limit of the sheet on the edges of the body, in a zone covered by the sheet.

It comprises a folding line extending transversely to the walls of the body approximately at the level of the limit of the sheet on the edges of the body, in a zone which is not covered by the sheet.

It comprises at least one fold which defines an angle and in the region of which a reinforcing element is accommodated.

The reinforcing element is embedded in the profile between two thicknesses of material of the profile welded one against the other or in immediate proximity to one another forming a rib opposite the wall to which the sheet is fixed.

The reinforcing element is made of metal.

The reinforcing element is made of a synthetic material.

The reinforcing element is made of poly(styrene/acrylonitrile).

The reinforcing element has an L-shaped cross section.

The reinforcing element has a cross section of general cylindrical shape.

The reinforcing element comprises unevennesses such as grooves or channels.

The reinforcing element has a helical shape.

BRIEF DESCRIPTION OF THE DRAWINGS

Other characteristics and advantages of the invention will emerge from the description below of embodiments of the invention given by way of non-limiting examples and illustrated by the appended drawings, in which:

FIG. 1 is a cross section of a profile capable of being folded using the method according to the invention;

FIG. 2 is an external side view of a part of the profile in FIG. 1 and of a tool for implementing the invention before the start of a folding operation;

FIG. 3 is a longitudinal section of the profile with the tool in FIG. 2 during the action of this tool on the profile;

FIG. 4 is a longitudinal section of that part of the profile in FIGS. 2 and 3 in which a rightangled fold has been produced;

FIG. 5 is an external side view corresponding to the longitudinal section in FIG. 4;

DETAILED DESCRIPTION OF THE INVENTION

Figure 6A:
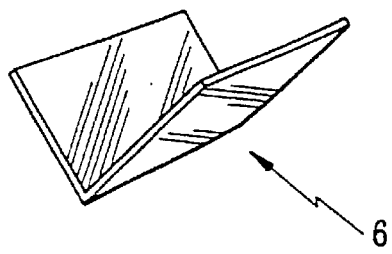
FIGS. 6A, and 6B show in perspective two embodiments of a reinforcing insert for the folds of profiles folded according to the invention.

The composite profile intended to be folded using the method according to the invention and shown in FIG. 1 comprises a hollow body 1 which has a contour, in this case completely closed, of approximately rectangular cross section, with two approximately parallel opposite walls 11, 12 connected by edges 13, 14. This profile body is made of extruded synthetic material, for example a thermoplastic resin, and is provided with a sealing covering in the form of a covering sheet 2, in this case made of aluminum, fixed against a first one of the walls and those regions of the edges 13, 14 close to this first wall 11. The width of each of the walls is of the order of between a few millimeters and a few tens of millimeters according to the planned application, and the edges extend over a height of a few millimeters.

The object of the method is to fold this composite profile at a desired angle, for example at right angles, so that the covering sheet 2 is located outside the angle.

According to the invention, with a view to folding, that part of the profile provided with its covering sheet in which a fold is to be produced (the work portion) is heated in such a manner that there is a temperature gradient extending from the covering sheet 2 to the second wall 12 opposite the first wall 11 to which the sheet is fixed, the optimum folding temperatures for the synthetic material of the profile and for the covering sheet being different. The function of the temperature gradient, which therefore depends on the nature of the materials of the body 1 and the covering sheet 2, is to avoid one and/or the other of the two components being at a temperature far from the range of temperatures at which it has a ductility which allows folding without splits or cracks.

Preferably, the heating is not to bring the body to a temperature at which its synthetic material becomes soft, in order to avoid undesirable spontaneous deformations, and so as not to hamper its passage from one station to another (in this case in the direction of the arrow in FIG. 2) in the folding installation.

To prepare the formation of the fold, use is made of a tool 3 comprising a forming projection 4, in this case of general prismatic shape with an approximately triangular or ogive-shaped section. The tool is arranged in such a manner that the length of the prism extends transversely to the walls 11, 12 of the body of the profile on the outer side of the second wall 12 opposite the first wall 11 which is provided with the covering sheet. The length of the prism is approximately equal to the width of the walls 11, 12.

When the composite profile is hot with a temperature gradient as mentioned above, and at least the forming projection 4 of the tool (if not all of the tool) is also hot, the hot projection is pressed against the second wall 12 of the profile opposite the covering sheet 2. This wall 12 is thus pushed back so as locally to bring it closer to or into contact with the first wall 11 to which the covering sheet is fixed in order to "form" the region of the future fold in the work portion of the hollow body. The tool and its projection 4 are then retracted.

As the edges 13, 14 of the profile are supported by means of shaping elements (not shown in the diagrams) so as to prevent them from being deformed laterally in relation to the profile, one of the two sections of the composite profile which is on either side of the shaped region (i.e., work portion) is pivoted for folding, or both sections are pivoted, so as to produce in this shaped region a fold along a folding line 5 (the end of which can be seen in FIGS. 4 and 5) extending transversely with respect to the walls 11, 12 of the body, approximately at the level of the limit of the covering sheet 2 on the edges 13, 14 of the body.

The shaping elements, for example in the form of guides forming a corridor, which support the edges 13, 14 of the profile to prevent their deformation in a direction transverse to the walls of the body at the time of the folding itself, can be applied against the edges only after the second wall 12 opposite the covering sheet 2 and the first wall 11 provided with the covering sheet have been brought closer or into contact, or before the contact of the forming projection 4 with the profile. Therefore, lateral deformation of the edges when the projection of the forming tool is pressed against the body can be prevented.

The location of the folding line 5 is defined by means of the folding device (not shown in the diagrams) which pivots at least one of the sections of the composite profile which are on both sides of the shaped region for folding. This folding device comprises an articulation having a folding articulation axis, and it is arranged so that this articulation axis extends at right angles to the longitudinal direction of the profile and parallel to the walls of the body facing the desired location of the edges of the profile, at the level of which the line designated by the term "folding line" extends.

In order to obtain clean folding, it would be necessary for this folding line 5 to be as close as possible to that part of the covering sheet 2 which covers the first wall 11. However, given the fact that the covering sheet also covers a certain region of the edges 13, 14, a folding line located at the level of this covered region and very close to that part of the covering sheet 2 which covers the first wall 11 would weaken the sheet and could give rise to splitting of the sheet. For this reason, the folding line 5 extends transversely to the walls of the body approximately at the level of the limit of the covering sheet 2 on the edges 13, 14 of the body, whether in a zone of the edges which is covered by the covering sheet or in a zone which is not covered.

By virtue of the fact that the two walls 11, 12 of the body are brought closer or into contact, no incipient tear is created. Furthermore, as a result of the folding, the second wall of the body opposite the covering sheet has, in the region of the fold, a pleat 15 comprising two thicknesses of material which can be welded one against the other or in immediate proximity. This pleat forms a stiffening rib extending in the direction of the first wall 11 to which the covering sheet 2 is fixed and, to be more precise, of the apex of the folding angle. These two thicknesses of material also constitute a stop which, to a certain limit, opposes accidental folding beyond the folding angle defined by the shape of the projection 4 of the forming tool 3.

After formation of the fold, to accelerate the return of the profile to a temperature at which it can be handled without any special precaution, the region of this fold can then be cooled.

In the event of the application of the method to the production of polygonal, for example rectangular, frames, it is necessary to produce a number of folds along one length of a profile. In order to reduce the duration of production of the frame, it is advantageous to perform a number of operations simultaneously on one profile. For example, one or more parts of the profile can be heated while a forming projection is pressed onto one or more other hot parts where a fold is produced immediately.

For example, the profile can be conveyed along and stopped in successive stations of the folding installation, in which stations, respectively, the profile is heated, pressure is applied to one wall of the body and a fold is produced in the profile, and the region of the fold is cooled.

It is also possible, in one station, to heat a part of the profile, then to press a projection against it, and to produce the fold in this part in successive operations.

By means of this method, it is possible to fold profiles comprising two elements consisting respectively of a hollow body made of synthetic material and a sealing covering sheet made of, for example, aluminum strip fixed on one wall of the body and those regions of the edges close to this walls in a reliable and rapid manner.

The method which has just been described therefore makes it possible to obtain folded profiles in which the regions of the folds are at least as rigid as, and generally more rigid than, the regions of the folds in folded profiles according to the prior art.

However, this method makes it possible further to increase the rigidity by arranging an element 6 made of relatively rigid or hard material forming a reinforcing insert in the region of one or more folds of the profile. The length of this insert 6 extends transversely to the profile.

The cross section of the insert 6 (along a longitudinal plane therefore in relation to the profile) has an appropriate shape for allowing (to the extent possible) both easy installation and secure anchoring, or forgiving greater place to one of these two aspects.

Figure 6B:
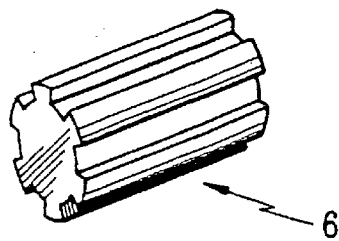

By way of example, reference will be made to a shape with an L-shaped cross section (FIG. 6A), a general cylindrical shape with a smooth circular cross section or having unevennesses such as grooves or channels (FIG. 6B), and also a helical shape made of, for example, spring steel.

The folding method is only slightly modified by the installation of the insert, and two variants of the embodiment of the fold allowing this installation will be given by way of example.

In the first variant, after a hot forming projection 4 has first been pressed against the second wall 12 of the profile so as locally to bring it closer to or into contact with the first wall 11 to which the sheet 2 is fixed, the projection 4 is then retracted as explained previously. The element 6 forming the insert is then accommodated in the region of the future fold, and the method is continued as explained previously. In other words, while supporting the edges 13, 14 of the profile, at least one of the sections of the profile which are on both sides of the formed region is pivoted so as to produce the fold. In this variant, the element 6 forming the insert can in practice be accommodated in the region of the future fold at ambient temperature but, as an alternative, it can be heated beforehand and be accommodated while hot in the region of the future fold.

Figure 7:
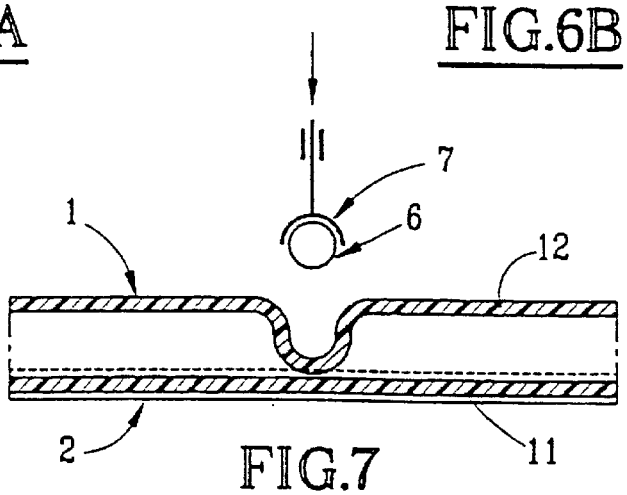
FIG. 7 is a longitudinal section of the profile showing diagrammatically a stage of accommodating a reinforcing insert prior to folding according to a first variant of the method according to the invention.

On the practical level, the rigid element 6 forming the insert is connected in a detachable manner to a tool 7. After the tool 3 carrying the projection 4 has been retracted so as to remove the projection from the region of the future fold it has just formed, the tool 7 carrying the element forming the insert is brought closer so that this element is on the same side of the profile and facing this region (FIG. 7). The element 6 is then arranged against this region, the element 6 is disconnected from the tool 7, and the tool is retracted.

Figure 8:
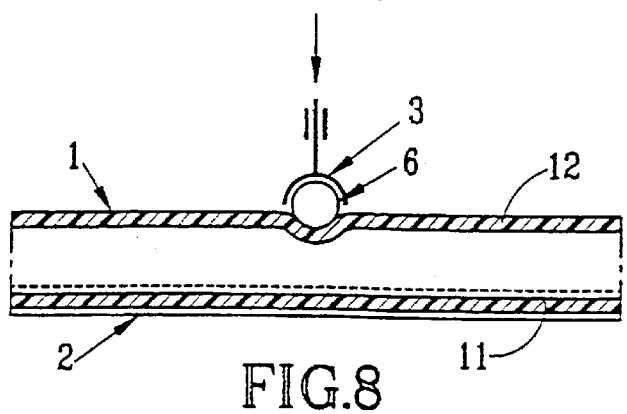
FIG. 8 is a longitudinal section of the profile showing diagrammatically a stage of accommodating a reinforcing insert prior to folding according to another variant of the method according to the invention.

In the second variant, the function of the forming projection 4 is performed by the rigid element 6 itself, or in part by this rigid element Thus, the rigid element forming the insert 6 is connected in a detachable manner to an appropriate tool 3. After having heated a part of the profile in which a fold is to be produced with the temperature gradient mentioned above, a part of the detachable rigid element 6, which has been heated beforehand, is pressed against the second wall 12 of the profile (FIG. 8) so as locally to bring it closer to or into contact with the first wall 11 to which the covering sheet 2 is fixed. Then, instead of retracting the rigid element which has performed the function of the forming projection 4, only the tool 3 is retracted after having disconnected from it this detachable element 6. The at least partial heating of the rigid element can be effected before or after its detachable connection to the tool 3.

After having disconnected the element 6 and retracted the tool 3, the element is accommodated in the region of the future fold, and the edges 13, 14 of the profile are supported so as to prevent them from being deformed. At this point, at least one of the sections of the profile which are on both sides of the formed region is pivoted, as already described.

Figure 9:
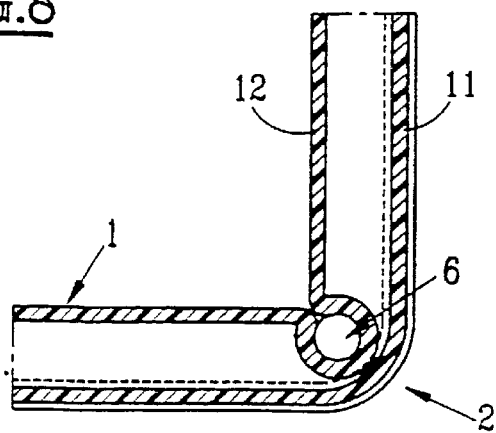
FIG. 9 is a longitudinal section of the profile showing diagrammatically a reinforcing insert accommodated in a profile folded according to the invention.

Thus, the element 6 is accommodated in the profile between two thicknesses of material of the latter which are welded against one another or in immediate proximity to one another, forming a rib opposite the first wall 11 to which the covering sheet 2 is fixed (FIG. 9). Preferably, the element is entirely embedded in the profile, and to this end its length is at most equal to the distance between the edges 13, 14 of the profile.

The material of the element 6 is selected according to the level of rigidity and the anchoring quality desired. Various metals and synthetic materials are particularly appropriate.

The choice of material may also be influenced by the shape it is desired to impart to the insert.

For example, in the case of an L-shaped insert, a metal can be selected, and in the case of a helical to be more precise, hardened spring steel. In the case of a smooth cylindrical insert or one with unevennesses intended to facilitate incrustation of the material of the profile, the selection of a synthetic material such as a poly (styrene/acrylonitrile) makes secure adhesion possible.

However, it is clear that the invention is not limited to the embodiments described and shown above, and it is possible to envisage others without leaving its scope.

What is claimed is:

1. A method of folding a composite profile, comprising:

fixing a covering sheet to a first wall of a work portion of a hollow body, the hollow body being formed of the first wall connected to an opposing second wall by a pair of edges so as to form an at least substantially closed profile, the covering sheet being fixed to the first wall so as to cover the first wall and a part of each of the pair of edges;

heating the work portion of the hollow body so as to form a temperature gradient in the work portion, the temperature gradient extending from the covering sheet to the second wall of the hollow body;

pressing one of a hot forming projection and a tool carrying a detachable hot projecting element against the second wall of the work portion of the hollow body so as to bring the second wall closer to the first wall within the work portion;

retracting the one of the hot forming projection and the tool after detaching the hot projecting element therefrom so as to form a fold region in the work portion;

supporting the pair of edges so as to prevent the pair of edges from being deformed laterally; and pivoting at least one section of the hollow body adjacent to the work portion so as to produce a fold along a fold line in the fold region, the fold line extending so as to intersect the first wall and the second wall.

2. The method of claim 1, wherein said heating of the work portion comprises heating the work portion to a temperature no greater than a temperature at which a material of the hollow body becomes soft.

3. The method of claim 1, wherein said supporting of the pair of edges comprises supporting the pair of edges prior to said pressing so as to prevent the pair of edges from being deformed laterally during said pressing.

4. The method of claim 1, wherein said supporting of the pair of edges comprises supporting the pair of edges only after said pressing is complete.

5. The method of claim 1, wherein said pivoting includes aligning a folding articulation axis facing a desired location of the fold line so as to locate the fold line at the desired location.

6. The method of claim 1, wherein said pivoting includes locating the fold line at an end of the covering sheet covering the part of each of the pair of edges in a zone covered by the covering sheet.

7. The method of claim 1, wherein said pivoting includes locating the fold line at an end of the covering sheet covering the part of each of the pair of edges in a zone not covered by the covering sheet.

8. The method of claim 1, further comprising cooling at least the fold region of the work portion.

9. The method of claim 1, wherein the hollow body has at least two work portions, said heating comprising heating one of the work portions while at least one other work portion of the hollow body is being pressed.

10. The method of claim 9, further comprising conveying the hollow body between successive stations of a folding machine and stopping the hollow body at each of the successive stations, wherein the successive stations of the folding machine include a first station for performing said heating, a second station for performing said pressing, a third station for performing said pivoting, and a fourth station for cooling the fold.

11. The method of claim 1, further comprising performing said heating, said pressing, and said pivoting in one station of a folding machine.

12. The method of claim 1, wherein said pressing comprises pressing a tool carrying a detachable hot projecting element against the second wall, the method further comprising:

attaching the hot projecting element to the tool in a detachable manner prior to said pressing; and heating at least a part of the hot projecting element after said attaching.

13. The method of claim 1, wherein said pressing comprises pressing a tool carrying a detachable hot projecting element against the second wall, the method further comprising:

attaching the hot projecting element to the tool in a detachable manner prior to said pressing; and heating at least a part of the hot projecting element prior to said attaching.

14. A method of folding a composite profile, comprising:

fixing a covering sheet to a first wall of a work portion of a hollow body, the hollow body being formed of the first wall connected to an opposing second wall by a pair of edges so as to form an at least substantially closed profile, the covering sheet being fixed to the first wall so as to cover the first wall and a part of each of the pair of edges;

heating the work portion of the hollow body so as to form a temperature gradient in the work portion, the temperature gradient extending from the covering sheet to the second wall of the hollow body;

pressing one of a hot forming projection and a tool carrying a detachable hot projecting element against the second wall of the work portion of the hollow body so as to bring the second wall closer to the first wall within the work portion;

retracting the one of the hot forming projection and the tool after detaching the hot projecting element therefrom so as to form a fold region in the work portion;

accommodating an insert element within the fold region;

supporting the pair of edges so as to prevent the pair of edges from being deformed laterally; and pivoting at least one section of the hollow body adjacent to the work portion so as to produce a fold along a fold line in the fold region, the fold line extending so as to intersect the first wall and the second wall.

15. The method of claim 14, wherein said heating of the work portion comprises heating the work portion to a temperature no greater than a temperature at which a material of the hollow body becomes soft.

16. The method of claim 14, wherein said supporting of the pair of edges comprises supporting the pair of edges prior to said pressing so as to prevent the pair of edges from being deformed laterally during said pressing.

17. The method of claim 14, wherein said supporting of the pair of edges comprises supporting the pair of edges only after said pressing is complete.

18. The method of claim 14, wherein said pivoting includes aligning a folding articulation axis facing a desired location of the fold line so as to locate the fold line at the desired location.

19. The method of claim 14, wherein said pivoting includes locating the fold line at an end of the covering sheet covering the part of each of the pair of edges in a zone covered by the covering sheet.

20. The method of claim 14, wherein said pivoting includes locating the fold line at an end of the covering sheet covering the part of each of the pair of edges in a zone not covered by the covering sheet.

21. The method of claim 14, further comprising cooling at least the fold region of the work portion.

22. The method of claim 14, wherein the hollow body has at least two work portions, said heating comprising heating one of the work portions while at least one other work portion of the hollow body is being pressed.

23. The method of claim 22, further comprising conveying the hollow body between successive stations of a folding machine and stopping the hollow body at each of the successive stations, wherein the successive stations of the folding machine include a first station for performing said heating, a second station for performing said pressing, a third station for performing said pivoting, and a fourth station for cooling the fold.

24. The method of claim 14, further comprising performing said heating, said pressing, and said pivoting in one station of a folding machine.

25. The method of claim 14, further comprising heating the insert element prior to accommodating the insert element within the fold region.

26. A method of folding a composite profile, comprising:

fixing a covering sheet to a first wall of a work portion of a hollow body, the hollow body being formed of the first wall connected to an opposing second wall by a pair of edges so as to form an at least substantially closed profile, the covering sheet being fixed to the first wall so as to cover the first wall and a part of each of the pair of edges;

heating the work portion of the hollow body so as to form a temperature gradient in the work portion, the temperature gradient extending from the covering sheet to the second wall of the hollow body;

pressing a tool carrying a detachable hot projecting element against the second wall of the work portion of the hollow body so as to bring the second wall closer to the first wall within the work portion and so as to form a fold region in the work portion;

retracting the tool after detaching the hot projecting element therefrom such that the hot projecting element is retained and accommodated within the fold region of the hollow body;

supporting the pair of edges so as to prevent the pair of edges from being deformed laterally; and pivoting at least one section of the hollow body adjacent to the work portion so as to produce a fold along a fold line in the fold region, the fold line extending so as to intersect the first wall and the second wall.

27. The method of claim 26, further comprising:

attaching the hot projecting element to the tool in a detachable manner prior to said pressing; and heating at least a part of the hot projecting element after said attaching.

28. The method of claim 26, further comprising:

attaching the hot projecting element to the tool in a detachable manner prior to said pressing; and heating at least a part of the hot projecting element prior to said attaching.

29. The method of claim 26, wherein said heating of the work portion comprises heating the work portion to a temperature no greater than a temperature at which a material of the hollow body becomes soft.

30. The method of claim 26, wherein said supporting of the pair of edges comprises supporting the pair of edges prior to said pressing so as to prevent the pair of edges from being deformed laterally during said pressing.

31. The method of claim 26, wherein said supporting of the pair of edges comprises supporting the pair of edges only after said pressing is complete.

32. The method of claim 26, wherein said pivoting includes aligning a folding articulation axis facing a desired location of the fold line so as to locate the fold line at the desired location.

33. The method of claim 26, wherein said pivoting includes locating the fold line at an end of the covering sheet covering the part of each of the pair of edges in a zone covered by the covering sheet.

34. The method of claim 26, wherein said pivoting includes locating the fold line at an end of the covering sheet covering the part of each of the pair of edges in a zone not covered by the covering sheet.

35. The method of claim 26, further comprising cooling at least the fold region of the work portion.

36. The method of claim 26, wherein the hollow body has at least two work portions, said heating comprising heating one of the work portions while at least one other work portion of the hollow body is being pressed.

37. The method of claim 36, further comprising conveying the hollow body between successive stations of a folding machine and stopping the hollow body at each of the successive stations, wherein the successive stations of the folding machine include a first station for performing said heating, a second station for performing said pressing, a third station for performing said pivoting, and a fourth station for cooling the fold.

38. The method of claim 26, further comprising performing said heating, said pressing, and said pivoting in one station of a folding machine.

39. A profile comprising:
- a hollow body including a first wall connected to an opposing second wall by a pair of edges so as to form a substantially closed contour, said hollow body being bent to form an angle;
- a covering sheet fixed against said first wall and a part of each of said pair of edges adjacent to said first wall, said covering sheet being located on an outer surface of said angle; and
- a pleat in said second wall forming a double-layered rib extending from said second wall toward said first wall.

40. The profile of claim 39, wherein said pleat includes a fold line at an end of said covering sheet covering said part of each of said pair of edges, and in a zone covered by said covering sheet.

41. The profile of claim 39, wherein said pleat includes a fold line at an end of said covering sheet covering said part of each of said pair of edges, and in a zone not covered by said covering sheet.

42. The profile of claim 39, further comprising a reinforcing element accommodated within said pleat between a first layer and a second layer of said double-layered rib.

43. The profile of claim 42, wherein said reinforcing element is formed of a metal material.

44. The profile of claim 42, wherein said reinforcing element is formed of a synthetic material.

45. The profile of claim 42, wherein said reinforcing element is formed of one of styrene and acrylonitrile.

46. The profile of claim 42, wherein said reinforcing element includes one of grooves and channels.

47. The profile of claim 42, wherein said pleat includes a fold line at an end of said covering sheet covering said part of each of said pair of edges, and in a zone covered by said covering sheet.

48. The profile of claim 42, wherein said pleat includes a fold line at an end of said covering sheet covering said part of each of said pair of edges, and in a zone not covered by said covering sheet.

49. The profile of claim 42, wherein said reinforcing element has an L-shaped cross-section.

50. The profile of claim 49, wherein said pleat includes a fold line at an end of said covering sheet covering said part of each of said pair of edges, and in a zone covered by said covering sheet.

51. The profile of claim 49, wherein said pleat includes a fold line at an end of said covering sheet covering said part of each of said pair of edges, and in a zone not covered by said covering sheet.

52. The profile of claim 49, wherein said reinforcing element is formed of a metal material.

53. The profile of claim 49, wherein said reinforcing element is formed of a synthetic material.

54. The profile of claim 49, wherein said reinforcing element is formed of one of styrene and acrylonitrile.

55. The profile of claim 49, wherein said reinforcing element includes one of grooves and channels.

56. The profile of claim 42, wherein said reinforcing element has a cylindrical-shaped cross-section.

57. The profile of claim 56, wherein said reinforcing element is formed of a metal material.

58. The profile of claim 56, wherein said reinforcing element is formed of a synthetic material.

59. The profile of claim 56, wherein said reinforcing element is formed of one of styrene and acrylonitrile.

60. The profile of claim 56, wherein said reinforcing element includes one of grooves and channels.

61. The profile of claim 56, wherein said pleat includes a fold line at an end of said covering sheet covering said part of each of said pair of edges, and in a zone covered by said covering sheet.

62. The profile of claim 56, wherein said pleat includes a fold line at an end of said covering sheet covering said part of each of said pair of edges, and in a zone not covered by said covering sheet.

* * * * *